United States Patent Office 3,535,132
Patented Oct. 20, 1970

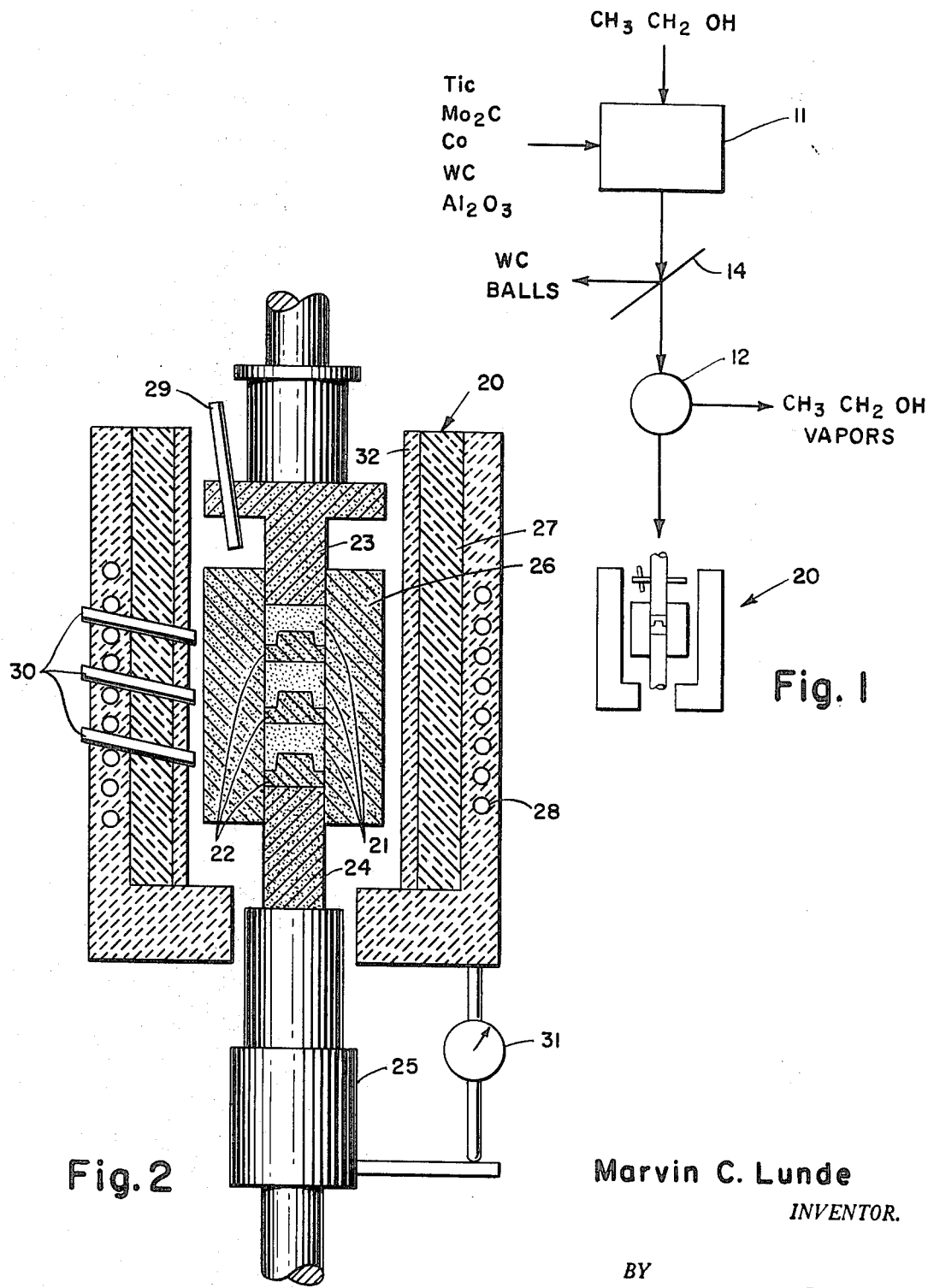

3,535,132
TITANIUM CARBIDE MOLTEN METAL BARRIER AND METHOD OF PRODUCTION
Marvin C. Lunde, Boulder, Colo., assignor to the United States of America as represented by the United States Atomic Energy Commission
Filed Dec. 15, 1967, Ser. No. 690,823
Int. Cl. C04b 35/52
U.S. Cl. 106—43                                    5 Claims

ABSTRACT OF THE DISCLOSURE

A molten metal barrier or container composition comprising titanium carbide, dimolybdenum carbide, cobalt, tungsten carbide, and alumina, particularly useful to fabricate crucibles or other instrumentalities subjected to contact by such as molten nickel metal, temperatures to about 1550° C., vacuums to about $3 \times 10^{-5}$ torr, electron bombardment, and thermal shock. A method of preparation comprising mixing, powdering, drying, and hot press forming.

BACKGROUND OF INVENTION

Transition metals combined with a nonmetal element are especially suited for molten service because of their high melting points and refractory qualities. (These materials will hereafter be referred to as refractory compounds.) Extreme conditions in the presence of particular molten metals may create an environment within which many refractory compounds weaken and fail.

For instance, high vacuums and temperatures cause outgassing and accompanying damage to certain refractory materials. Nitride compounds and cerium monosulfide are particularly unsatisfactory in this respect. The transition element carbides, however, having relatively high boiling points and stability at high temperatures, are generally suitable construction materials under high vacuums.

An accepted method for heating crucibles or containers containing molten metal is by electron bombardment. However, some refractories such as tetraboron carbide, boron nitride, and those containing large percentages of alumina are extensively eroded by the bombardment and are therefore not entirely suitable when this type heating is used.

When the heating rate is high, most refractories locally expand rapidly, and cracking may occur if the expansion is restrained by contiguous material. When the material is porous more localized expansion can be tolerated without failure. Also a refractory having a relatively low coefficient of expansion and high resiliency would generally be less apt to crack under thermal shock.

Molten nickel is a very difficult substance to handle. It attacks titanium carbide, tantalum carbide, molybdenum carbide and other refractories. It penetrates into voids within materials which accelerates the attack. Furthermore, it must be maintained at a high temperature (M.P. 1455° C.) which generally reduces construction material strength and increases the rate of any destructive chemical reaction.

If a crucible material is produced with sufficient voids to prevent cracking under thermal shock it would consequently be more readily penetrated by the molten nickel metal. If the material is pressed at high temperatures to collapse the voids it would be more susceptible to cracking, not only as a result of its dense unyielding structure, but from its reduced strength resulting from grain growth at high temperatures.

SUMMARY OF INVENTION

It is an object of this invention to provide a high melting point molten metal barrier and method for producing the same.

It is also an object to provide a crucible or container which is resistant to chemical attack by molten nickel metal at high temperatures and vacuums.

It is a further object to provide a crucible or container having good resistance to thermal shock and erosion from electron bombardment.

Further objects and advantages will clearly appear from the following description and specific novel features will be particularly set forth in the claims.

The molten metal barrier comprises titanium carbide, dimolybdenum carbide, cobalt, tungsten carbide, and alumina. Preparation includes powdering followed by a hot press process in which pressure and temperature are elevated in a prescribed manner to a final pressure and temperature.

DESCRIPTION OF DRAWINGS

Preferred embodiments of the invention have been shown in the drawings wherein:

FIG. 1 is a flow diagram showing method of producing the molten metal barrier; and FIG. 2 is a partially cutaway elevation view of a die press which may be used in hot press forming one or more crucibles or containers.

DETAIL DESCRIPTION

FIG. 1 illustrates diagrammatically a method of preparing the molten metal barrier whereby the constituents are powdered and mixed within a ball mill 11 containing a grinding liquid or media, the grinding media is subsequently evaporated within a suitable drier 12, and finally the powder is hot pressed into a usable form by means of a die press 20.

Powdering and mixing may be accomplished by a number of methods but may include milling and mixing within a jar composed of or incorporating one constituent and with balls composed of or incorporating a second constituent. For instance an alumina jar and tungsten carbide balls may be used such that these constituents are introduced into the mill powder as the mill jar and balls are eroded. An advantage of this method is that impurities are not introduced from a ball mill constructed of alien materials.

The inventor has discovered that tungsten carbide balls add about 0.15–0.30 weight percent of tungsten carbide per hour, while an alumina jar contributes about 0.01–0.07 weight percent of alumina per hour to the load within the mill. Of course proportions contributed by attrition will vary with the amount of load and the mill size, but one skilled in the art can readily determine such contribution rates for a particular mill and operation. Since the proportions of tungsten carbide and alumina in the molten metal barrier are small, it is practical to introduce all of these ingredients by this method although supplementary amounts may be added if desired.

The other constituents of the molten metal barrier are measured out in about the following proportions: 92 to 93 weight percent titanium carbide 0.75 to 1.5 weight percent dimolybdenum carbide, and 0.3 to 0.75 weight percent cobalt. Although any specific proportions within these ranges will yield a satisfactory molten metal barrier, a particularly effective molten metal barrier for use as a molten nickel containing crucible may be prepared by measuring out 185 parts by weight titanium carbide, 2 parts by weight dimolybdenum carbide, 1 part by weight cobalt, and by operating the ball mill for a sufficient length of time to contribute 10 parts by weight tungsten carbide and 2 parts by weight alumina.

The three constituents introduced as raw materials are preferably about 10 micron particle size or less and about 98 percent by weight purity which may contribute to a molten metal barrier product having small grain size. If these constituents cannot be readily obtained commercially at this particle size they may be separately ground in preparatory ball mill operations. As an alternative all of the ingredients regardless of their initial particle size may be powdered and mixed in a single ball mill operation, but if the particle sizes vary over a broad range, a longer grinding period will be required as the milling of the larger particles will be rendered inefficient by the presence of fines. If the raw materials are not of sufficient purity, contaminants may alter the desired grain structure or other properties of the molten metal barrier.

The milling and mixing within the alumina jar ball mill 11 containing tungsten carbide balls may last for at least five to eight hours. Ethanol or any other suitable liquid may be added as a grinding media to increase efficiency. This operation should thoroughly admix the constituents and reduce their particle size to about 1–10 microns.

After completion of the milling operation the powder is separated from the tungsten carbide balls and dried by any suitable means. A shaker screen 14 way be used to separate the balls from the wet powder while a tumble drier 12 may be used to evaporate the ethanol.

Hot pressing integrates the powder into a dense material free from voids. The pressure and temperatures should be closely controlled at a level high enough to collapse voids and thus minimize or prevent penetration of molten metal when the barrier material is subsequently used as a crucible, but yet not so high as to promote excessive grain growth and accompanying reduced strength. Another limitation on the hot press temperature is possible reaction with the press materials. Where a graphite die is used the powder reacts excessively therewith at temperatures above 1800° C. However, at this temperature excessive grain growth is generally not a problem with the molten metal barrier composition, such that with a suitable die, press temperatures between 1900–2200 might be used.

A die press assembly generally designated 20 in FIG. 2 may be used to form crucibles or containers from the milled powder 21. Several graphite die inserts 22 may be included between the graphite plungers 23 and 24 so that more than one crucible or container may be formed with a single pressing. Pressure is applied by means of the press ram 25. The graphite die 26 is surrounded by an induction coil 28 for heating the powder and a suitable insulation 27 such as bubbled zirconia supported by a suitable refractory shield 32 which may be of zirconia. The assembly is preferably evacuated or blanketed with an inert gas such as argon introduced at 29 during pressing to prevent reaction with the atmosphere. The temperature of the powder may be measured with an optical pyrometer through suitable ports 30, while compaction is registered on the dial gauge 31.

Novel features in the hot press method may be illustrated by the following example. An initial pressure of 1–100 p.s.i.g. is exerted on the finely ground dry powder arranged within the die press assembly. The pressure is maintained while the temperature of the powder is increased to 1000° C.–1300° C. at a rate of about 200° C.–300° C. per minute. This initial temperature and pressure is maintained for a few minutes to permit outgassing of the powder and die to subside. The powder is then pressurized to the final pressure of 2000–8000 p.s.i.g. Pressures in excess of 8000 p.s.i.g. might be operative although not tried due to the limitations of the particular press used in reducing this invention to practice. Generally final pressures used in forming the molten metal barrier have been between 6000–7000 p.s.i.g. Heating is continued at the same rate until a final temperature of 1600° C.–2200° C. is reached. Final temperature and pressure are then maintained until the compaction ceases.

This method has produced dense crucibles with few voids and small grain size not only from powders of the stated composition but of a large number of other refractory compounds.

The constituent weight percentages of the molten metal barrier should be within the range of about 88 to 96 weight percent titanium carbide, about 2.0 to 10.0 weight percent tungsten carbide, about 0.5 to 3.0 weight percent dimolybdenum carbide, about 0.5 to 2.0 weight percent alumina and about 0.1 to 1.0 weight percent cobalt. However, a particular effective composition for a molten nickel containing crucible would include 92.5 weight percent titanium carbide, 5.0 weight percent tungsten carbide, 1.0 weight percent dimolybdenum carbide, 1.0 weight percent alumina, and 0.5 weight percent cobalt.

In general, the physical properties of the molten metal barrier are substantially constant throughout the range of proportions specified. It has a density of about 5.1 grams per cubic centimeter and a knopp hardness of 1400. (Knopp hardness is defined as—Microhardness determined from the resistance of metal to indentation by a pyramidal diamond indenter, having edge angles of 172° 30' and 130°, making a rhombohedral impression with one long and one short diagonal—Metals Handbook, vol. 1—Properties and Selection of Metals, 8th Edition.) It is metal gray in color and very similar in most respects to titanium carbide. The grain structure is uniform and generally finer than that of titanium carbide which has been subjected to the same hot press procedure. Accordingly, the molten metal barrier has good strength at high temperatures.

Crucibles of the molten metal barrier have successfully contained molten nickel heated to 1550° C. by electron bombardment while at vacuum below $3 \times 10^{-5}$ torr. (One torr is equivalent $1/760$ of an atmosphere pressure.) Furthermore, thermal shock induced by heating rates of 600° C.–800° C./min. generally failed to crack or produce excessive outgassing from such crucibles.

Each constituent in the molten metal barrier contributes to its qualities. The basic compound, titanium carbide, is a hard, high melting point material with relatively fine grain structure which does not undergo excessive outgassing at high temperatures and vacuums. The solid solution formed with it and tungsten carbide greatly enhances the oxidation resistance of the molten metal barrier. When compared separately the oxidation resistance of tungsten carbide or titanium carbide is much less than the solid solution state of tungsten carbide in titanium carbide. Cobalt may increase resistance to thermal shock by forming at the grain boundaries probably imparting resilience and strength to the grain bonds. Dimolybdenum carbide and alumina may also contribute to thermal shock resistance.

Although not actually tried, other similar elements might be substitute for individual constituents in the novel composition without affecting its properties. For instance nickel might be substituted for cobalt and alumina might be replaced by such as the oxides of baryllium, uranium, zirconium or thorium.

The molten metal barrier may be used as a container material not only for molten nickel, but also for other molten metals such as iron or cobalt. It may also be employed for thermocouple protection tubes, electrode sheaths or protective coatings in metallurgical processes or space vehicles, as well as be used for arc lamp electrodes, machining tools or other applications requiring strength at elevated temperatures, high thermal conductivity, resistance to oxidation, hardness or any other properties set out herein as characteristic of the molten metal barrier.

It will be understood that various changes in the details, materials, and methods which have been herein described and illustrated in order to explain the nature of the invention, may be made by those skilled in the art within the

What is claimed is:

1. A barrier for containing molten metal for use at temperatures up to about 1550° C. and under vacuum down to about $3 \times 10^{-5}$ torr and resistant to electron bombardment erosion and thermal shocks comprising the hot pressed material of about 88 to 96% by weight titanium carbide, about 2 to 10 percent by weight tungsten carbide, about 0.5 to 3.0 percent by weight dimolybdenum carbide, about 0.1 to 1.0 percent by weight cobalt, and about 0.5 to 2.0 percent by weight alumina.

2. The barrier for molten metal according to claim 1 wherein said constituents are present in about the following weight percentages: 92.5% titanium carbide, 5.0% tungsten carbide, 1.0% dimolybdenum carbide, 0.5% cobalt, and 1.0% alumina.

3. The barrier for molten metal according to claim 2 wherein the knoop hardness and density of said barrier is about 1400 and 5.1 grams per cubic centimeter respectively.

4. Method of manufacturing the barrier claimed in claim 1 comprising processing said titanium carbide, cobalt, and dimolybdenum carbide within a ball mill having an alumina jar and tungsten carbide balls to a homogeneous intermixture of not more than about 10 microns particle size infused with eroded particles of alumina and tungsten carbide, die pressing said intermixture within a graphite mold at an initial pressure of not less than about 1 p.s.i.g and not more than about 100 p.s.i.g. and an initial temperature of not less than about 1000° C. and not more than about 1300° C., subsequently increasing the temperature at a rate of not less than about 200° C., and not more than about 300° C. per minute to a final temperature of not less than about 1600° C. and not more than about 1800° C., pressurizing to a final pressure of not less than about 6000 p.s.i.g. and not more than about 7000 p.s.i.g., and maintaining said final pressure and temperature until compaction has ceased.

5. Method of preparing the molten metal barrier claimed in claim 1 which comprises powdering and intermixing the constituents, whereby the powdering and intermixing comprises milling the constituents against alumina and tungsten carbide bodies to a homogeneous intermixture of not more than about 10 microns particle size infused with eroded particles of alumina and tungsten carbide, followed by hot pressing the resulting intermixture, said hot pressing comprising exerting an initial pressure of not more than about 100 p.s.i.g. on the powdered composition, heating the composition to an initial temperature of not more than about 1300° C., pressurizing to a final pressure not less than about 2000 p.s.i.g, heating to a final temperature not less than about 1300° C. and not more than about 22° C. and maintaining said final temperature and pressure until compaction ceases References Cited

UNITED STATES PATENTS

| 2,084,349 | 6/1937 | Laise | 106—43 X |
| 2,568,251 | 9/1951 | Oswald | 106—43 |
| 2,849,305 | 8/1958 | Frost | 106—43 |
| 2,939,796 | 6/1960 | Wolff et al. | 106—43 |

HELEN M. McCARTHY, Primary Examiner

W. R. SATTERFIELD, Assistant Examiner

U.S. Cl. X.R.

29—182.7; 75—203; 264—65, 332